United States Patent [19]

Fuke

[11] Patent Number: 4,794,612

[45] Date of Patent: Dec. 27, 1988

[54] METAL ION LASER

[75] Inventor: Akira Fuke, Shizuoka, Japan

[73] Assignee: Koito Seisakusho Co. Ltd., Tokyo, Japan

[21] Appl. No.: 166,822

[22] Filed: Mar. 4, 1988

Related U.S. Application Data

[63] Continuation of Ser. No. 854,477, Apr. 22, 1986, abandoned.

[30] Foreign Application Priority Data

Apr. 23, 1985 [JP] Japan .................................. 60-85362

[51] Int. Cl.⁴ .............................................. H01S 3/22
[52] U.S. Cl. ......................................... 372/56; 372/88
[58] Field of Search ...................... 372/56, 33, 61, 85, 372/87, 88

[56] References Cited

U.S. PATENT DOCUMENTS

| | | | |
|---|---|---|---|
| 178,810 | 4/1886 | Kawase | 372/56 |
| 3,624,548 | 11/1971 | Sosnowski | 372/56 |
| 3,719,899 | 6/1973 | Breaux | 372/56 |
| 3,868,593 | 2/1975 | Fukuda et al. | 372/88 |
| 4,021,845 | 5/1977 | Wang | 358/85 |
| 4,031,428 | 5/1977 | Tokudome et al. | 372/56 |
| 4,052,680 | 10/1977 | Wang et al. | 372/33 |
| 4,105,954 | 8/1978 | Wang et al. | 372/56 |
| 4,193,042 | 3/1980 | Wang | 372/56 |
| 4,257,014 | 3/1981 | Hattori et al. | 372/88 |
| 4,510,608 | 4/1985 | Fujii et al. | 372/56 |
| 4,701,925 | 10/1987 | Fuke et al. | 372/56 |
| 4,710,938 | 12/1987 | Fuke et al. | 372/61 |

FOREIGN PATENT DOCUMENTS 0128685 7/1985 Japan .................................. 372/56

OTHER PUBLICATIONS

Lapp et al; "Advances in Laser Science-II"; American Institute of Physics Conference Proceedings No. 160; 1987.

E. B. Gordon et al; "Cooper Chloride Vapor Laser Process Limiting the Output Power"; Dec. 1979; Sov. J. Quantum Electron. 9(12); pp. 1526-1532.

K. Rozsa et al; "Investigation of a Helium-Cadmium Ion Laser With a Hollow Cathode"; Sov. J. Quantum Electron., vol. 4, No. 4 (Oct. 1974) pp. 523-524.

Primary Examiner—William L. Sikes
Assistant Examiner—B. Randolph
Attorney, Agent, or Firm—Browdy and Neimark

[57] ABSTRACT

A metal ion laser includes a glass tube, a hollow cathode installed in the glass tube, a plurality of anodes arranged on the glass tube, a pair of Brewster windows fixed to both end of the glass tube, at least one of reservoir recessed in the glass tube for storing a metal material to be evaporated, and at least one of communicating passage formed in the hollow cathode corresponding to each the reservoir so as to communicate between each reservoir and the inside of the hollow cathode. A cooling element is arranged on the glass tube, between the Brewster window and each end of the hollow cathode. A cooling system is arranged in a casing for the laser. The sputtered product is mainly deposited on the inner wall of the reservoir nearby the communicating passage, and the rest of the sputtered product and the vapored materials are deposited at the cooling element arranged between each end of the hollow cathode and each Brewster window. Thus the Brewster windows and the anodes can be free from being spoiled by the sputtered or evapored materials.

14 Claims, 6 Drawing Sheets

METAL ION LASER

This application is a continuation, of application Ser. No. 854,477, filed Apr. 22, 1986, now abandoned.

BACKGROUND OF THE INVENTION

(1) Field of the Invention

The present invention generally relates to a metal ion laser. More particularly, the present invention relates to an improvement in a configuration of a reservoir for storing metal material to be evaporated in the metal ion laser, and in a cooling system for cooling this laser in order to improve oscillating efficiency of laser light.

(2) Description of the Prior Art

In recent years various hollow-cathode type metal ion lasers, which use negative glow discharge, have been provided. Such type lasers are capable of multi-colors oscillation owing to their high intensive excitation. At the present stage we observe that a He-Cd ion laser can provide twelve light oscillating lines including three primary colors; i.e., red, blue and green. The He-Cd ion laser with this inherent property is superior to a liquid laser and a solid state laser.

Referring to FIG. 14, there is shown a typical example of such a hollow-cathode type metal ion laser as disclosed in Japanese Patent Application No. Sho. 58-236060. In this drawing, "a" represents a laser tube made of a glass material, which sealingly contains He gas. "b" and "c" represent Brewster windows sealingly secure to both ends of the laser tube "a". Further, the laser tube "a" contains a hollow-cathode "d", main anodes $e_1$, $e_2$ and $e_3$, auxiliary anodes $f_1$ and $f_2$, an insulator "g", and flat-shaped reservoirs $h_1$ and $h_2$ formed between a laser tube "a" and hollow-cathode "d" for the metal material "i" to be evaporated. In a thusly constituted metal ion laser, a required predetermined voltage is applied between the main and auxiliary anodes $e_1$, $e_2$, $e_3$, $f_1$ and $f_2$ and the hollow-cathode "d" so as to generate negative glow discharge between the main anodes and the hollow-cathode. If Cd is used as the metal material "i" to be evaporated, that is to provide a He-Cd type laser, Cd evaporates owing to the heat loss of the negative glow discharge. The evaporated Cd is excited to a high energy level by the excited particles of He ion, and then laser oscillation is generated.

On the other hand, such a hollow-cathode type metal ion laser involves a sputtering phenomenon caused by the cathode. Even if it is possible for the material for the cathode to be selected so as to decrease the sputtering, it is impossible to eliminate such sputtering completely. The sputtered product is discharged out of the cathode bore and moves towards the Brewster windows whose temperature is relatively lower than the cathode. Although the majority of the sputtered product is deposited on the parts, whose temperature is relatively low, in the laser tube before it arrives at the Brewster windows, the rest arrives at the Brewster windows and a considerable amount is deposited thereon. This deposited product makes the windows poor in their transparency. This causes a serious problem in that light loss at the Brewster windows becomes large, and thus the laser oscillation may become impossible. In addition to this problem, this deposition of the sputtered product shortens the length of life of the laser tube. On the other hand, the sputtered product exits out of the cathode bore at a relatively slow speed, so that the sputtered product moving slowly in the cathode bore may intercept the passage of light in the laser tube. This increases loss of the light of the laser oscillation, thereby worsening the efficiency of laser oscillation.

Further, the sputtered product may be deposited and pile-up in the vicinity of the anodes $e_1$, $e_2$ and $e_3$, and on the metal materials "i" to be evaporated. This deposited product in the vicinity of the anodes may cause troubles, such as a short-circuit between the anodes and the hollow cathode. The piled up product on the metal materials may obstruct the evaporation of these metals and/or may be evaporated again. These phenomena may worsen the efficiency of the laser oscillation.

(3) Object of the Invention

With these problems in mind, it is an object of the present invention to provide an improved metal ion laser which can be free from the troubles owing to the product caused by sputtering.

Another object of the present invention is to provide an improved metal ion laser which can prevent the sputtered product from depositing on the vicinity of the anodes, metal material to be evaporated, and Brewster windows.

SUMMARY OF THE INVENTION

To accomplish the above described objects, the metal ion laser according to the present invention comprises a glass tube, a hollow cathode installed in the glass tube, a pair of Brewster windows sealingly fixed to both ends of the glass tube, at least one reservoir recessed in the glass tube for storing a metal material to be evaporated, and at least one communicating passage formed in the hollow cathode corresponding to each reservoir so as to communicate between each reservoir and the inside of the hollow cathode.

According to another aspect of the present invention, a cooling means is arranged between each end of the hollow cathode and each Brewster window so as to prevent the Brewster window from being spoiled, and another cooling system comprises an exhaust fan arranged on a cover for covering the glass tube, and a longitudinal slit formed in a base member for supporting the glass tube and the cover.

In this metal ion laser, the product caused by sputtering in the cathode bore can be quickly and forcibly discharged from the cathode bore and introduced into the reservoir through the communicating passage so that the sputtered product can be deposited on the inner wall of the reservoir, and further the sputtered product can be forcibly deposited at the cooling means arranged between the ends of the hollow cathode and the Brewster window, even if the sputtered product generated in the cathode bore can be prevented from depositing on the vicinity of the anode, from piling on the metal material to be evaporated, and from spoiling the Brewster windows.

Other objects, features and advantages of the invention will be apparent from the following description taken in connection with the accompanying drawings.

DETAILED DESCRIPTION OF THE PREFERRED EMBODIMENT

Figure 1:
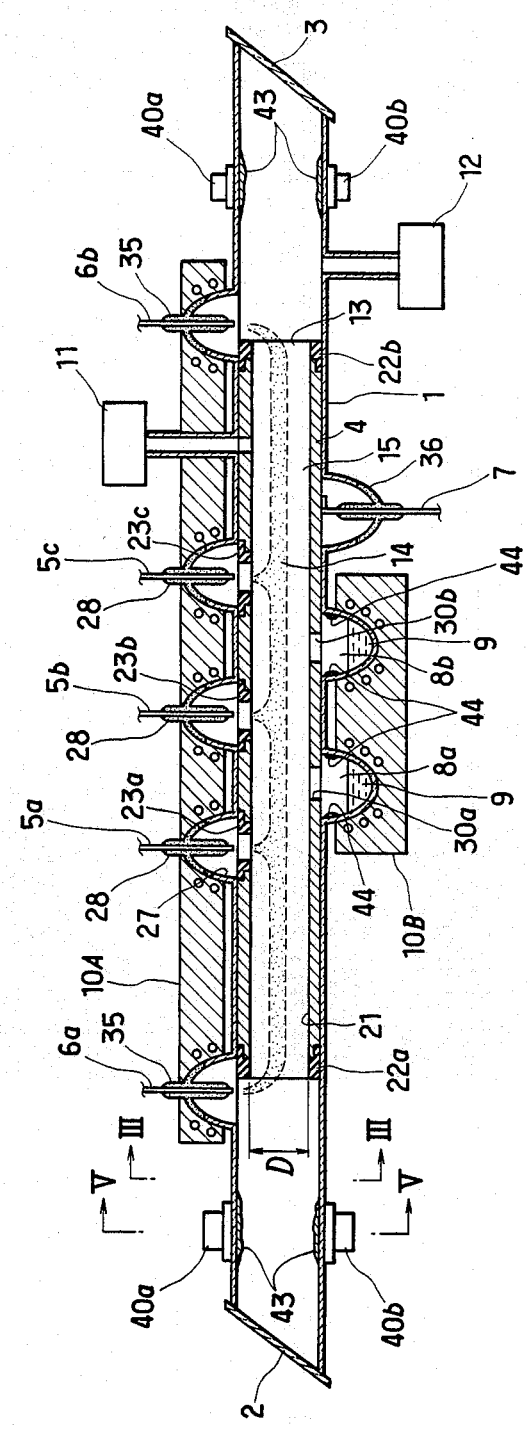
FIG. 1 is a longitudinal sectional view showing one embodiment of the metal ion laser according to the present invention.

Referring to FIG. 1, there is shown a preferred embodiment of a metal ion laser according to the present invention. In the drawing, the reference numeral 1 denotes a laser tube made of glass which is adapted for filling with He-gas. Brewster windows 2 and 3 are sealingly fixed to each end of the laser tube 1, respectively. The laser tube 1 contains a hollow cathode 4, three main anodes 5a, 5b and 5c, a pair of auxiliary anodes 6a and 6b, a cathode 7, two reservoirs 8a and 8b for storing metal material 9 to be evaporated such as a Cd-metal, a pair of ceramic heaters 10A and 10b, a He-gas supplier 11, and a getter 12 for removing impurities from the laser tube 1. Further, in FIG. 1 the reference numeral 13 denotes a positive column discharge passage, the numeral 14 denotes a glow discharge area, and the numeral 15 denotes a cathode dark space.

Figure 2:
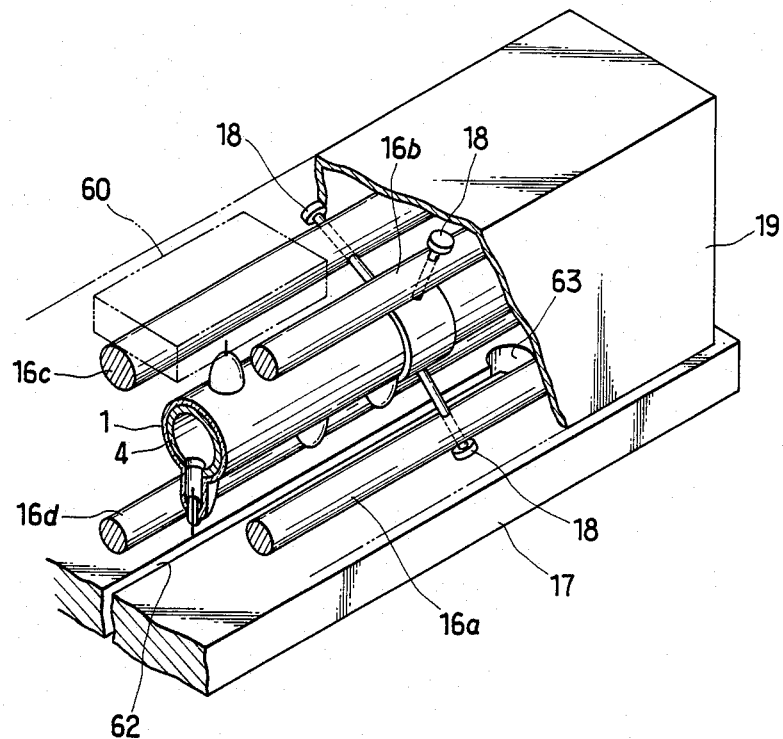
FIG. 2 is a partly sectional schematic perspective view showing a laser tube of FIG. 1 and a cooling system therefor.
Figure 3:
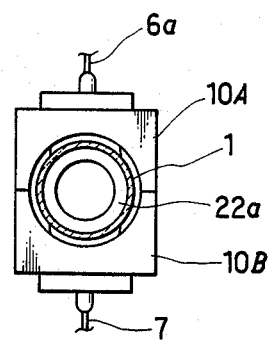
FIG. 3 is a cross sectional view taken along the line III—III in FIG. 1.

A thusly constituted laser tube 1 is supported and housed as shown in FIG. 2. In detail, four inner bars 16a, 16b, 16c and 16d are arranged in parallel to the laser tube 1, and connected by adjusting bolts 18 so as to support the tube 1. The reference numeral 17 denotes a base member for supporting the tube 1 and the inner bars 16a, 16b, 16c and 16d. The numeral 19 denotes a cover for housing the tube assembly.

Hereinafter, the above described components will be explained in detail.

The hollow cathode 4 is formed in a thick cylinder coaxially with the laser tube 1 and made of an electrically conductive material such as stainless steel. Its cylindrical hollow space represents a cathode bore 21 in which the glow discharge area 14 is generated. Both ends of the hollow cathode 4 are engaged with cylindrical insulators 22a and 22b made of ceramic, respectively. The hollow cathode 4 is formed with three through holes corresponding to the main anodes 5a, 5b and 5c. The through holes are respectively engaged with ring-shaped insulators 23a, 23b and 23c. These insulators 22a, 22b, 23a, 23b and 23c are effective for preventing the main anodes 5a, 5b, 5c from receiving a deposit of the cathode material generated from the surface of the hollow cathode 4 by sputtering of He ions (hereinafter, referred to as the "sputtered product") and/or for preventing the main anodes 5a, 5b, 5c and the hollow cathode 4 from falling thusly being in short-circuited owing to this sputtered product.

Figure 4:
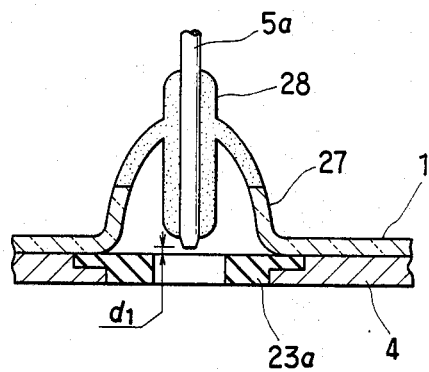
FIG. 4 is an enlarged sectional view showing an essential element of the laser tube shown in FIG. 1.

The main anodes 5a, 5b and 5c are made of tungsten, molybdenum, or the like. As shown in FIG. 4, the main anode 5a is set in a mount 27a formed on the laser tube 1 through a sealing glass 28a. The material of the sealing glass 28a depends on the material of the main anode 5a. In practice the main anode 5a is previously fixed to the sealing glass 28a and they are sealingly welded on the opening edge of the mount 27a. The top end of the main anode 5a is formed in a substantially conical shape in order to increase a discharge effect and to prevent it from abrading on account of discharge. The top end of the main anode 5a is isolated from the outer surface of the ring shaped insulator 23a through a narrow gap $d_1$, so that the top end of the main anode 5a can be free from breaking by the hollow cathode 4 when it is inserted into the laser tube 1. The other main anodes 5b and 5c are configured and arranged in the same manner as the main anode 5a. These main anodes 5a, 5b and 5c are arranged in the longitudinal direction of the laser tube 1 with a relatively short interval such as 2 cm in the case that the laser tube 1 has an active length of 30 cm and a bore diameter D of the hollow cathode 4 is 3.5 cm.

The reservoirs 8a and 8b for storing the metal material to be evaporated are formed in the laser tube 1 in such manner that two portions of the laser tube 1, located substantially opposite the main anodes 5a, 5b and 5c with respect to the longitudinal axis of the laser tube 1, are expanded outwards. The reservoirs 8a and 8b are communicated with the inside of the hollow cathode 4 through communicating passages 30a and 30b formed in the hollow cathode 4, respectively. The reservoirs 8a and 8b are arranged at the same interval as the main anodes 5a, 5b and 5c, but a shift of a half pitch with respect thereto. In other words, the reservoirs 8a and 8b are respectively located at the positions corresponding to the essentially centers between the main anodes 5a and 5b and between the main anodes 5b and 5c.

The auxiliary anodes 6a and 6b are adapted for protecting the Brewster windows 2 and 3, so that they are located close to both ends of the hollow cathode 4. They are sealingly fixed to the laser tube 1 by sealing glass 35 in the same manner as the main anodes 5a, 5b and 5c.

The cathode 7 is sealingly fixed to the laser tube 1 by the sealing glass 36 in the same manner as the main anodes 5a, 5b and 5c. The inner end of the cathode 7 is directly connected to the outer surface of the hollow cathode 4.

Figure 5:
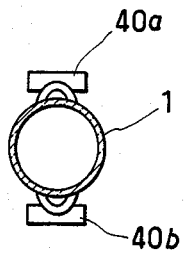
FIG. 5 is a cross sectional view taken along the line V—V in FIG. 1.
Figure 6:
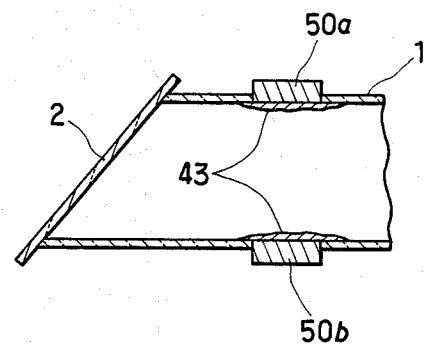
FIG. 6 is a partially sectional view showing one of the modifications of cooling means for the laser tube according to the present invention.
Figure 7:
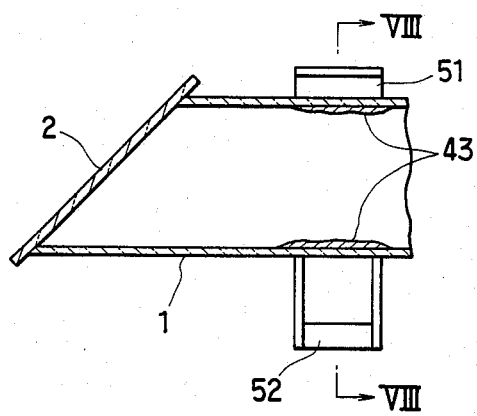
FIG. 7 is a partially sectional view showing another modification of the cooling means.
Figure 8:
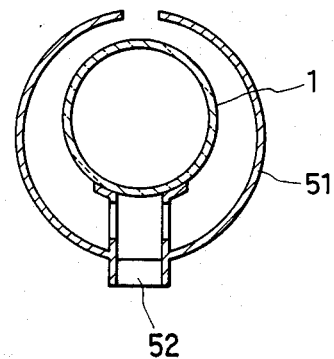
FIG. 8. is a cross sectional view taken along the line VIII—VIII in FIG. 7.
Figure 9:
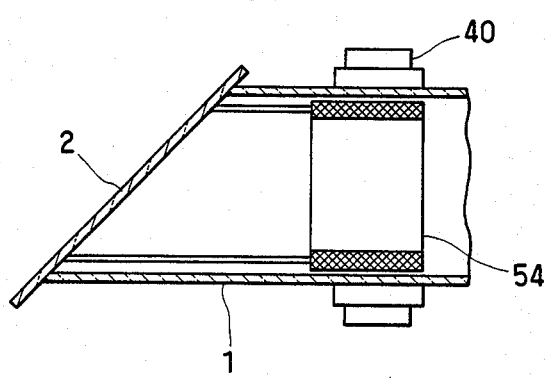
FIG. 9 is a partially sectional view showing other modification of the cooling means.
Figure 10:
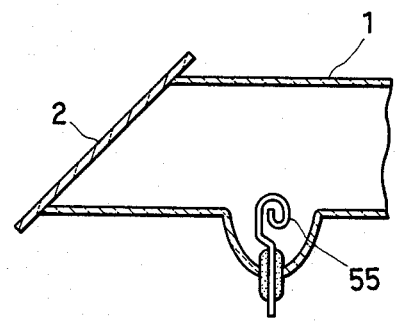
FIG. 10 is a partially sectional view showing other modification of the cooling means.

As shown in FIG. 1 and FIG. 5, one pair of cooling elements 40a and 40b is mounted on the outer surface of the laser tube 1 close to each end thereof and located between each end of the hollow cathode 4 and each the Brewster window. The cooling elements 40a and 40b are oppositely arranged with respect to the longitudinal axis of the laser tube 1. This cooling device can be selected from various configurations as shown in FIG. 6 to FIG. 10. In FIG. 6 a pair of blocks 50a and 50b made of the material having a high heat conductivity such as a metal is simply secured to the laser tube 1 and the blocks 50a and 50b are air cooled such as by ambient air. FIG. 7 shows a cooling device comprising a radiative plate 51 along the circumference of the laser tube 1 and a cooling fan 52. FIG. 8 shows a cross sectional view of this cooling device. In FIG. 1, FIG. 6 and FIG. 7 the reference numeral 43 denotes a deposited product by cooling. FIG. 9 shows a metal net 54 for catching the evaporated Cd and cathode material, which is installed in the laser tube 1 in addition to the cooling element 40. In FIG. 10 a metal rod 55 is inserted into the laser tube 1 and the outer end of the metal rod 55 is cooled by the ambient air.

In addition to this cooling means, the overall length of the laser tube 1 is cooled by an exhaust fan 60 represented by the phantom line in FIG. 2, which fan 60 is arranged on the top surface of the cover 1 at substantially the center along its longitudinal direction. On the other hand, the base member 17 is formed with a slit 62 extending along the longituinal direction of the laser tube 1. Each end of the slit 62 is formed with a circular opening 63, which circular opening 63 faces toward the cooling element or the vicinity of the end of the laser tube 1. The diameter of this circular opening 63 is considerably larger than the width of the slit 62. When the exhaust fan 60 is actuated, the air in the cover 19 is forcibly discharged outwards, and thus the ambient air is introduced through the slit 62 and the circular opening 63. This introduced ambient air cools the laser tube 1, especially its ends are more cooled more since more of the ambient air is introduced through the circular opening 63.

An operation of a thusly constituted metal ion laser (this case is a He-Cd laser which contains Cd as the metal material to be evaporated) will be explained as follows.

As a predetermined voltage is applied between the main and auxiliary anodes 5a, 5b, 5c, 6a and 6b, and the hollow cathode 4, a negative glow discharge is generated between the main anodes 5a, 5b and 5c, and the hollow cathode 4. The Cd-metal 9 is evaporated owing to the heat loss of the negative glow discharge and the evaporated particles are excited to a high energy level by energizing particles such as He-ions. In the case that the hollow cathode 4 is a thick pipe which has a high heat conductivity and a great heat capacity, the temperature distribution in the glow discharge area 14 is thusly kept constant, so that the transition from abnormal glow discharge to arc discharge can be prevented. Then the cathode material is subjected to sputtering owing to Cd-vapor and He-ions. The majority of the sputtered product from the cathode 4 is forcibly introduced into the reservoirs 8a and 8b through the communicating passages 30a and 30b formed in the hollow cathode 4. In the reservoirs 8a and 8b the sputtered product is deposited on only the limited portion of the inner wall close to the passages 30a and 30b. As shown in FIG. 1, the bottom side of the reservoirs 8a and 8b are heated by the ceramic heater 10B and the outer surface of this non-heated portion of each reservoir in the vicinity of the communicating passage is subjected to cooling by the ambient air, so that the non-heated portion is cooled. The deposited product on the non-heated portion of the inner wall is represented by the numeral 44 in FIG. 1.

Although the sputtered product is largely deposited on the inner walls of the reservoirs 8a and 8b, a little amount of the product flows towards the Brewster windows 2 and 3. In the vicinity of the Brewster windows 2 and 3, the temperature is relatively low in comparison with that in the central section of the tube 1 on account of the cooling elements 40a and 40b and the other cooling combination of the exhaust fan 60, the slit 62 and the circular opening 63. Thus the Cd-vapor and the sputtered product are completely deposited on the inner wall of the laser tube at the cooling elements 40a and 40b. Accordingly, the Brewster windows 2 and 3 can be free from being spoiled with the Cd-vapor and the sputtered product.

As described above, the top ends of the main anodes 5a, 5b and 5c are isolated from the cathode tube 4 so as to facilitate inserting the cathode tube 4 into the laser tube 1, and further this arrangement can prevent the sputtered pooduct from being introduced into the mounts 27a, 27b and 27c and depositing thereon. This effect results from the following reasons.

In this arrangement, the heat caused by discharge makes the inner walls of the mounts 27a, 27b and 27c hotter than the hollow cathode 4, and simultaneously sputtering owing to He-ion is generated therein. The Cd-vapor and the sputtered product are hardly deposited thereon. Even if the Cd-vapor enters behind the discharging point, i.e., the inner position of the mounts 27a, 27b and 27c, the vapor is forcibly rejected before depositing thereon by the electrophoretic force caused by the positive column discharge directly below the main anodes 5a, 5b and 5c. Thus the Cd-vapor cannot be deposited on the ring shape insulators 23a, 23b and 23c, the mounts 27a, 27b and 27c, and the sealing glasses 28a, 28b and 28c. This effect contributes to keeping the initial condition of the laser tube 1 constantly fine, without any troubles such as a short circuit between the main anodes 5a, 5b and 5c and the hollow cathode 4 owing to the deposited product on these elements. The same effect occurs at the auxiliary anodes 6a and 6b, so that the same explanation is not repeated.

This effect cannot be provided when the main anodes are inserted into the openings of the insulators 23a, 23b and 23c, and further the top ends of the main anodes are arranged at the same level of the inner surface of the cathode bore 13, or the top ends are protruded into the cathode bore 13.

In the laser tube 1 of this embodiment, the main anodes 5a, 5b and 5c are aligned at short intervals. This arrangement results in that the cathode surface of the hollow cathode 4 is always subjected to the sputtering by He-ions and thus the surface is kept clean.

The cathode bore 21 is communicated with the reservoirs 8a and 8b through the communicating passages 30a and 30b, respectively. These communicating passages 30a and 30b can prevent the plasma generated in the hollow cathode 4 from entering the reservoirs 8a and 8b, since the reservoirs 8a and 8b are isolated from the glow discharge area 14. Accordingly, this effect can prevent the Cd-vapor in the cathode bore from becoming excessive owing to the sputtering of He-ion and thus the pressure of Cd-vapor in the cathode bore can be controlled in response to only the temperature in the reservoirs.

The laser tube 1 is generally made of PYREX glass (commercial name) which is commonly used as a heat-resisting glass. The main anodes 5a, 5b and 5c are respectively assembled on the mounts 27a, 27b and 27c of the laser tube 1 through the sealing glasses 28a, 28b and 28c as shown in FIG. 4. According to this constitution, the sealing glasses 28a, 28b and 28c should be made of glass having substantially the same heat expansion coefficient of the glass for the laser tube 1. In this embodiment wherein the laser tube 1 is made of PYREX glass and the main and auxiliary anodes 5a, 5b, 5c, 6a and 6b are made of tungsten, the sealing glasses 28a, 28b and 28c are preferably made of a tungsten sealing glass such as CORNING 3320 (commercial name).

Figure 11A:
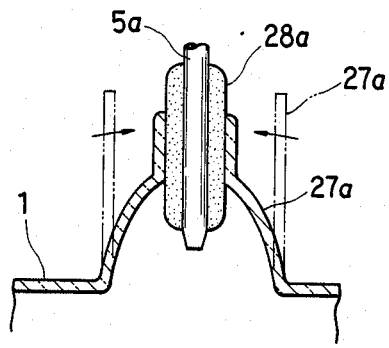
FIG. 11A and FIG. 11B are sectional views showing modifications of the anode mounting structure according to the present invention.
Figure 11B:
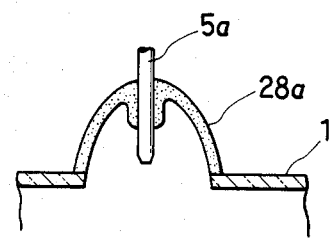

These sealing glasses 28a, 28b and 28c are not only limited to the sectional shape as shown in FIG. 4 but may be also formed in the configurations as shown in FIG. 11A and FIG. 11B. In FIG. 11A, a sealing glass 28a is simply formed in a cylindrical shape and also a mount 27a is previously formed in a cylindrical shape represented by the phantom line, and this mount 27a is heated so that the top end of the mount 27a is firmly welded to the external surface of the sealing glass 28a. In FIG. 11B, a sealing glass 28a is directly welded to the laser tube 1 without any intermediates such as the mount 27a.

Figure 12:
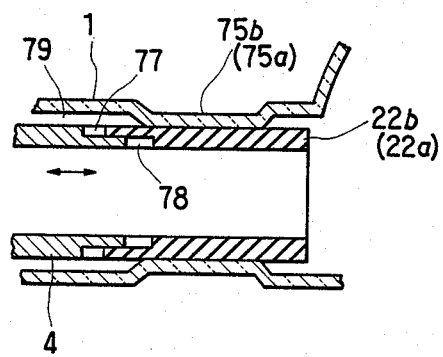
FIG. 12 is a sectional view showing another example of the hollow cathode fixing structure according to the present invention.

The heat expansion coefficient of the laser tube 1 is different from that of the hollow tube 4; the latter is greater than the former, so that it is preferable to form a space between them in order to absorb the expansion of the hollow tube 4. In practical manner the diameter of the laser tube 1 is decreased in the vicinity of each end, represented by the numeral 75b (75a) as shown in FIG. 12 so that the cylindrical insulator 22b (22a) is firmly fit within the small diameter section 75b (75a). On the other hand, the heat expansion of the hollow tube 4 in the longitudinal direction can be absorbed by spaces 77 and 78 which are formed by engaging the hollow tube 4 and the cylindrical insulator 22b (22a) slidably in the longitudinal direction. The space defined between the laser tube 1 and the hollow cathode 4, represented by the numeral 79 in FIG. 22, is completely closed by the small diameter section 75b (75a) of the laser tube 1 and the cylindrical insulators 22a and 22b. Accordingly, the Cd-vapor cannot flow towards the Brewster windows from the space 79.

Figure 13:
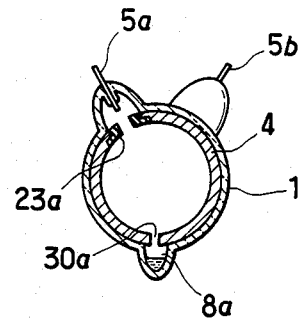
FIG. 13 is a cross sectional view showing another embodiment of the laser tube according to the present invention.
Figure 14:
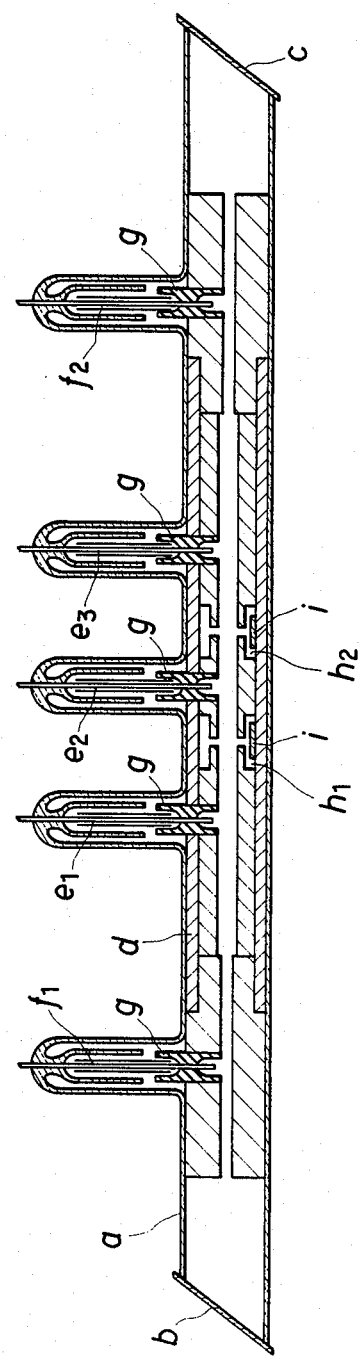
FIG. 14 is a longitudinal sectional view showing a conventional metal ion laser.

In this embodiment, the main anodes 5a, 5b and 5c are aligned on the laser tube 1 in its longitudinal direction. This invention is not only limited to this configuration and this number, but several modifications can also be used. For example, as shown in FIG. 13, the main anodes 5a and 5b are shifted left and right alternatively in the cross section of the laser tube 1. In other words, the main anodes are arranged on two lines so that a substantially V-shaped configuration in the cross sectional view is formed among the left side main anode series (5a, 5c, ---), the right side main anode series (5b, 5d, ---), and the reservoirs 8a, 8b, ---. In the top view of the laser tube 1, the anodes are arranged in a zig-zag configuration, which can decrease the interval distance between the main anodes. This may possibly provide a compact-sized laser tube 1 with a high performance.

It is further understood by those skilled in the art that the foregoing description is a preferred embodiment of the disclosed device and that various changes and modifications may be made in the invention without departing from the spirit and scope as set out in the accompanying claims.

What is claimed is:

1. A hollow cathode metal ion laser of negative glow discharge type comprising:
    a laser tube made of glass material;
    a hollow cathode installed in the laser tube;
    a plurality of anodes arranged in the laser tube, said anodes being provide on a first side of the laser tube, each of said anodes being spaced from each other axially along said laser tube;
    a pair of Brewster windows sealingly fixed to axial opposite ends of the laser tube;
    a plurality of reservoirs provided outside of the hollow cathode and in the laser tube for storing a metal material therein and for evaporating the same, each of said reservoirs being provided on a second side of the laser tube substantially opposite from said anodes, said reservoirs being formed by projecting portions of said laser tube outward, said reservoirs being located between the positions corresponding to the opposite ends of the hollow cathode in the laser tube;
    a plurality of slits formed in said hollow cathode corresponding to each of said reservoirs for communicating the inner side of the hollow cathode with said reservoirs; and
    heaters for heating said anodes and the bottom sides of said reservoirs respectively.

2. A metal ion laser according to claim 1, wherein each of said reservoirs is axially spaced from each of said anodes.

3. A metal ion laser according to claim 1, wherein said laser tube extends generally horizontally, with said anodes being provided on an upper side of the laser tube, and said reservoirs being provided on a lower side of said laser tube.

4. A metal ion laser according to claim 3, wherein said heaters are ceramic heaters.

5. A metal ion laser according to claim 1, wherein said anodes are arranged in an axial direction of said laser tube with a relatively short interval between adjacent pairs thereof, and each said anode has a tip end which is spaced from said hollow cathode in a radial direction with respect thereto by a short distance.

6. A metal ion laser according to claim 1, further comprising a cooling system for providing at least one relatively cooler part of the laser.

7. A metal ion laser according to claim 6, wherein said cooling system comprises a first cooling means mounted on the laser tube and located between each said Brewster window and a respective adjacent axial end of said hollow cathode.

8. A metal ion laser according to claim 7, comprising a housing containing said laser with each said anode, reservoir and Brewster window, wherein said cooling system further comprises a second cooling means including an exhaust fan for ventilating said housing, and a slit is formed in a base portion of said housing for introducing atmospheric air into the housing.

9. A metal ion laser according to claim 8, wherein said slit extends generally parallel to said laser tube, and has circular openings at opposite ends thereof in said housing in the vicinity of respective ends of said laser tube.

10. A metal ion laser according to claim 7, wherein said first cooling means comprises at least one block made of a material having high heat conductivity which is attached to a respective part of the outer surface of the laser tube.

11. A metal ion laser according to claim 7, wherein said first cooling means comprises a heat conductive plate encircling a portion of an outer circumference of said laser tube, and a cooling fan for cooling said heat conductive plate.

12. A metal ion laser according to claim 7, wherein said first cooling means comprises a metal net installed in the laser tube for collecting metal vapor therein from each said reservoir.

13. A metal ion laser according to claim 7, wherein said first cooling means comprises a metal rod extending through the wall of the laser tube with an outer end thereof protruding to be air-cooled.

14. A metal ion laser according to claim 1, wherein said laser is a He-Cd laser.

* * * * *